United States Patent
Adamy

(10) Patent No.: US 12,490,708 B2
(45) Date of Patent: Dec. 9, 2025

(54) METHODS AND COMPOSITIONS FOR CONTROLLING FLOW IN CLAY-BASED MATERIALS

(71) Applicant: Church & Dwight Co., Inc., Princeton, NJ (US)

(72) Inventor: Steven T. Adamy, Lawrenceville, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 686 days.

(21) Appl. No.: 17/795,706

(22) PCT Filed: Jan. 28, 2021

(86) PCT No.: PCT/US2021/015360
§ 371 (c)(1),
(2) Date: Jul. 27, 2022

(87) PCT Pub. No.: WO2021/154905
PCT Pub. Date: Aug. 5, 2021

(65) Prior Publication Data
US 2023/0104861 A1    Apr. 6, 2023

Related U.S. Application Data

(60) Provisional application No. 62/967,102, filed on Jan. 29, 2020.

(51) Int. Cl.
*A01K 1/015*    (2006.01)
*C04B 33/13*    (2006.01)

(52) U.S. Cl.
CPC ........ *A01K 1/0154* (2013.01); *C04B 33/1305* (2013.01)

(58) Field of Classification Search
CPC ..... A01K 1/0154; A01K 1/0155; B01J 20/12; B01J 20/22; B01J 20/28059; C04B 33/1305

See application file for complete search history.

(56) References Cited

U.S. PATENT DOCUMENTS

| | | | |
|---|---|---|---|
| 5,018,482 | A | 5/1991 | Stanislowski et al. |
| 6,177,386 | B1 * | 1/2001 | Aurin .................. C10M 169/04 508/125 |

(Continued)

FOREIGN PATENT DOCUMENTS

| | | |
|---|---|---|
| CN | 109233762 A | 1/2019 |
| WO | 2007149842 A2 | 12/2007 |
| WO | 2009006377 A1 | 1/2009 |

OTHER PUBLICATIONS

Haddad, B., et al., 2016, ChemXpress, 9(4),295-302. (Year: 2016).*

(Continued)

*Primary Examiner* — Brian A McCaig
(74) *Attorney, Agent, or Firm* — Church & Dwight Co., Inc.

(57) ABSTRACT

The present disclosure provides methods for controlling swelling of a clay when in contact with an aqueous medium. The methods may include contacting clay with a content of an ionic liquid sufficient to modify one or more transport properties of water through the clay. In particular, in some embodiments, the present disclosure provides clay-based animal litter compositions having controlled flow and clump shape, and a related method. The animal litter can include a clay-based liquid absorbing material and at least one ionic liquid.

15 Claims, 7 Drawing Sheets

(56) References Cited

U.S. PATENT DOCUMENTS

| | | | |
|---|---|---|---|
| 6,962,129 B1 | 11/2005 | Lawson | |
| 8,084,402 B2 | 12/2011 | Berry et al. | |
| 8,720,375 B2 | 5/2014 | Miller et al. | |
| 8,864,883 B2 | 10/2014 | Becze et al. | |
| 2003/0197305 A1 | 10/2003 | Collins | |
| 2009/0029880 A1 | 1/2009 | Berry et al. | |
| 2013/0305997 A1 | 11/2013 | Miller et al. | |
| 2014/0017751 A1* | 1/2014 | Zavrel | B01D 3/004 435/166 |

OTHER PUBLICATIONS

Makhoukhi, B., et al., 2010, Applied Clay Science, 50, 354-361. (Year: 2010).*

Nasser MS, Onaizi SA, Hussein IA, Saad MA, Al-Marri MJ, Benamore A, Intercalation of ionic liquids into bentonite: Swelling and rheological behaviors, Colloids and Surfaces A: Physicochemical and Engineering Aspects, vol. 507 (2016), pp. 141-151.

Xu J, Qiu Z, Zhao X, Zhong H, Huang W, Study of 1-Octyl-3-methylimidazolium bromide for inhibiting shale hydration and dispersion, Journal of Petroleum Science and Engineering, vol. 177 (2019), pp. 301-214.

* cited by examiner

METHODS AND COMPOSITIONS FOR CONTROLLING FLOW IN CLAY-BASED MATERIALS

CROSS-REFERENCE TO RELATED APPLICATIONS

The present application is a U.S. National Stage of International Patent Application PCT/US2021/015360, filed Jan. 28, 2021, and claims priority to U.S. Provisional Patent Application No. 62/967,102, filed Jan. 29, 2020. The disclosures of each of the applications noted above are incorporated herein by reference in their entirety.

FIELD OF THE DISCLOSURE

The present disclosure relates to methods and compositions for controlling flow of an aqueous liquid through a clay-based material. More particularly, the clay-based material may be a natural formation or a product of manufacture, and the flow control may be achieved, at least in part, through addition of an ionic liquid.

BACKGROUND

Generally, clay-based materials are used in a variety of industrial and/or commercial settings and the characteristics associated with many clay-based materials can vary. For example, clay-based materials may be present in natural settings, such as in natural formations, or they may be used in products of manufacture and other applications. In particular, bentonite clays (which contain the mineral montmorillonite) are commonly used due to their ability to exhibit high cation exchange capacity and a high degree of swelling upon interaction with water. Such clays may be referred to as "swelling clays" and are useful in many applications for their ability to absorb various compounds contained within an aqueous medium. For example, montmorillonite-based clays are employed in applications such as, e.g., oil exploration and extraction, foundry molding, permeation inhibition (e.g., in holding ponds for hazardous waste), and pet litter compositions. Clay-based materials typically provide for significant swelling that is beneficial in some applications, such as when used in forming animal litter products; however, significant swelling can inhibit permeation of liquids therein and cause blockage of flow within the clay-based materials. Accordingly, there remains a need in the field for methods of controlling flow within clay-based materials.

SUMMARY OF THE DISCLOSURE

The present disclosure relates to methods of controlling flow in clay-based materials, and compositions having controlled flow characteristics. One aspect of the present disclosure provides a method for controlling swelling of a clay when in contact with an aqueous medium, the method comprising contacting clay with a content of an ionic liquid sufficient to modify one or more transport properties of water through the clay. In some embodiments, the clay may be contacted with the ionic liquid prior to contact with the aqueous medium. In some embodiments, the clay, the ionic liquid, and the aqueous medium are contacted simultaneously. In some embodiments, the ionic liquid may be an imidazolium salt. In some embodiments, the ionic liquid may be selected from the group consisting of 1-ethyl-3-methyl imidazolium ethylsulfate, 1-ethyl-3-methyl imidazolium acetate, 1-ethyl-3-methyl imidazolium diethylphosphate, and combinations thereof. In some embodiments, the clay may be a bentonite clay, for example. In some embodiments, the one or more transport properties may be selected from the group consisting of permeation rate, flow rate, rate of sorption, directional flow, and combinations thereof.

Some aspects of the present disclosure relate to controlling flow in clay-based animal litter compositions. For example, in some embodiments, the present disclosure relates to animal litter compositions comprising a clay-based liquid absorbing material and at least one ionic liquid. In some embodiments, the ionic liquid is present in an amount of about 0.01 mmol/g clay-based liquid absorbing material to about 0.2 mmol/g clay-based liquid absorbing material. In some embodiments, the ionic liquid may be an imidazolium salt. In some embodiments, the at least one ionic liquid is selected from the group consisting of 1-ethyl-3-methyl imidazolium ethylsulfate, 1-ethyl-3-methyl imidazolium acetate, 1-ethyl-3-methyl imidazolium diethylphosphate, and combinations thereof. In some embodiments, the animal litter composition may further comprise a filler comprising one or both of the following: a non-absorbent, non-soluble substrate; an absorbent substrate. In some embodiments, the litter composition may further comprise one or more clumping agents, de-dusting agents, fragrances, bicarbonates, binders, and preservatives.

In some embodiments, the clay-based liquid absorbing material may have a surface area of about 15 m$^2$/g or less. In some embodiments, the clay-based liquid absorbing material has a surface area of about 10 m$^2$/g or less. In some embodiments, the clay-based liquid absorbing material has an average particle size of about 0.1 mm to about 5 mm. In some embodiments, the clay-based liquid absorbing material comprises bentonite clay. In some embodiments, the litter composition according to the present disclosure may comprise the clay-based liquid absorbing material in an amount of about 35% to about 55% by weight; the filler in an amount of about 40% to about 60% by weight, the filler being a non-absorbent, non-soluble substrate; and the ionic liquid present in an amount of about 0.15% to about 5.0% by weight, based on the total weight of the clay-based liquid absorbing material and the ionic liquid.

In some embodiments, the present disclosure provides methods of preparing animal litter compositions having modified flow properties. For example, in some embodiments, the method may comprise forming an animal litter composition as a mixture of at least a clay-based liquid absorbing material and at least one ionic liquid. In some embodiments, the mixture further comprises one or more additives selected from the group consisting of fillers, clumping agents, de-dusting agents, fragrance, bicarbonates, binders, and preservatives. In some embodiments, the ionic liquid is combined with the clay-based liquid absorbing material prior to adding the one or more additives.

In some embodiments, the one or more additives are added to the clay-based liquid absorbing materials prior to mixing with the at least one ionic liquid. In some embodiments, the ionic liquid is added in the express absence of a carrier solvent. In some embodiments, the method excludes drying the animal litter composition. In some embodiments, the ionic liquid is an imidazolium salt. In some embodiments, the ionic liquid is selected from the group consisting of 1-ethyl-3-methyl imidazolium ethyl sulfate, 1-ethyl-3-methyl imidazolium acetate, 1-ethyl-3-methyl imidazolium diethylphosphate, and combinations thereof. In some embodiments, the ionic liquid is applied in an amount of about 0.01 mmol/g clay-based liquid absorbing material to about 0.2 mmol/g clay-based liquid absorbing material.

The present disclosure thus includes, without limitation, the following embodiments:

Embodiment 1

A method for controlling swelling of a clay when in contact with an aqueous medium, the method comprising contacting clay with a content of an ionic liquid sufficient to modify one or more transport properties of water through the clay.

Embodiment 2

The method of any preceding embodiment, wherein the clay is contacted with the ionic liquid prior to contact with the aqueous medium.

Embodiment 3

The method of any preceding embodiment, wherein the clay, the ionic liquid, and the aqueous medium are contacted simultaneously.

Embodiment 4

The method of any preceding embodiment, wherein the ionic liquid is an imidazolium salt.

Embodiment 5

The method of any preceding embodiment, wherein the ionic liquid is selected from the group consisting of 1-ethyl-3-methyl imidazolium ethyl sulfate, 1-ethyl-3-methyl imidazolium acetate, 1-ethyl-3-methyl imidazolium diethylphosphate, and combinations thereof.

Embodiment 6

The method of any preceding embodiment, wherein the clay is a bentonite clay.

Embodiment 7

The method of any preceding embodiment, wherein the one or more transport properties are selected from the group consisting of permeation rate, flow rate, rate of sorption, directional flow, and combinations thereof.

Embodiment 8

An animal litter composition comprising: a clay-based liquid absorbing material; and at least one ionic liquid.

Embodiment 9

The animal litter composition of any preceding embodiment, wherein the ionic liquid is present in an amount of about 0.01 mmol/g clay-based liquid absorbing material to about 0.2 mmol/g clay based liquid absorbing material (about 0.15% to about 5.0% by weight, based on the total weight of the clay-based liquid absorbing material and the ionic liquid).

Embodiment 10

The animal litter composition of any preceding embodiment, wherein the ionic liquid is an imidazolium salt.

Embodiment 11

The animal litter composition of any preceding embodiment, wherein the at least one ionic liquid is selected from the group consisting of 1-ethyl-3-methyl imidazolium ethylsulfate, 1-ethyl-3-methyl imidazolium acetate, 1-ethyl-3-methyl imidazolium diethylphosphate, and combinations thereof.

Embodiment 12

The animal litter composition of any preceding embodiment, further comprising a filler comprising one or both of the following: a non-absorbent, non-soluble substrate; an absorbent substrate.

Embodiment 13

The animal litter composition of any preceding embodiment, wherein the litter composition further comprises one or more clumping agents, de-dusting agents, fragrances, bicarbonates, binders, and preservatives.

Embodiment 14

The animal litter composition of any preceding embodiment, wherein the clay-based liquid absorbing material has a surface area of about 15 $m^2$/g or less.

Embodiment 15

The animal litter composition of any preceding embodiment, wherein the clay-based liquid absorbing material has a surface area of about 10 $m^2$/g or less.

Embodiment 16

The animal litter composition of any preceding embodiment, wherein the clay-based liquid absorbing material has an average particle size of about 0.1 mm to about 5 mm.

Embodiment 17

The animal litter composition of any preceding embodiment, wherein the clay-based liquid absorbing material comprises bentonite clay.

Embodiment 18

The animal litter composition of any preceding embodiment, comprising: the clay-based liquid absorbing material in an amount of about 35% to about 55% by weight; the filler in an amount of about 40% to about 60% by weight, the filler being a non-absorbent, non-soluble substrate; and the ionic liquid present in an amount of about 0.15% to about 5.0% by weight, based on the total weight of the clay-based liquid absorbing material and the ionic liquid.

Embodiment 19

A method of preparing an animal litter composition having modified flow properties, the method comprising forming an animal litter composition as a mixture of at least a clay-based liquid absorbing material and at least one ionic liquid.

Embodiment 20

The method of any preceding embodiment, wherein the mixture further comprises one or more additives selected from the group consisting of fillers, clumping agents, de-dusting agents, fragrance, bicarbonates, binders, and preservatives.

Embodiment 21

The method of any preceding embodiment, wherein the ionic liquid is combined with the clay-based liquid absorbing material prior to adding the one or more additives.

Embodiment 22

The method of any preceding embodiment, wherein the one or more additives are added to the clay-based liquid absorbing materials prior to mixing with the at least one ionic liquid.

Embodiment 23

The method of any preceding embodiment, wherein the ionic liquid is added in the express absence of a carrier solvent.

Embodiment 24

The method of any preceding embodiment, wherein the method excludes drying the animal litter composition.

Embodiment 25

The method of any preceding embodiment, wherein the ionic liquid is an imidazolium salt.

Embodiment 26

The method of any preceding embodiment, wherein the ionic liquid is selected from the group consisting of 1-ethyl-3-methyl imidazolium ethyl sulfate, 1-ethyl-3-methyl imidazolium acetate, 1-ethyl-3-methyl imidazolium diethylphosphate, and combinations thereof.

Embodiment 27

The method of any preceding embodiment, wherein the ionic liquid is applied in an amount of about 0.01 mmol/g clay-based liquid absorbing material to about 0.2 mmol/g clay-based liquid absorbing material.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure or recited in any one or more of the claims, regardless of whether such features or elements are expressly combined or otherwise recited in a specific embodiment description or claim herein. This disclosure is intended to be read holistically such that any separable features or elements of the disclosure, in any of its aspects and embodiments, should be viewed as intended to be combinable, unless the context of the disclosure clearly dictates otherwise.

BRIEF DESCRIPTION OF THE FIGURES

Figure 1:
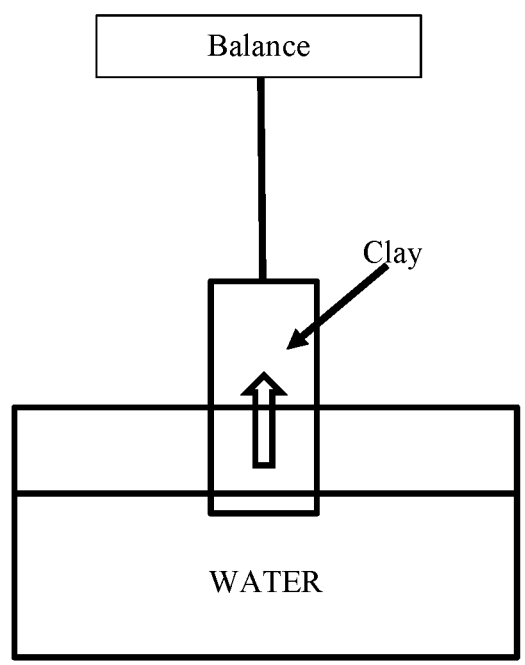
Figure 2:
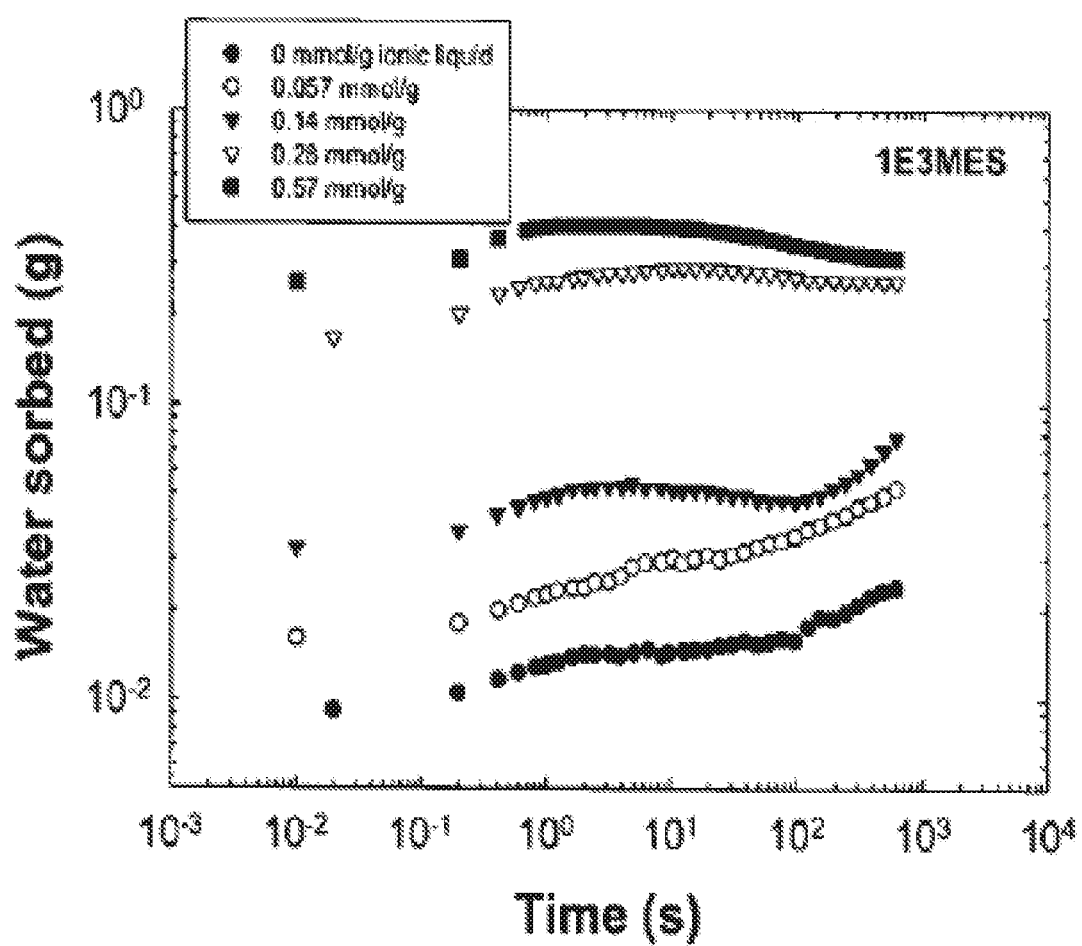
Figure 3:
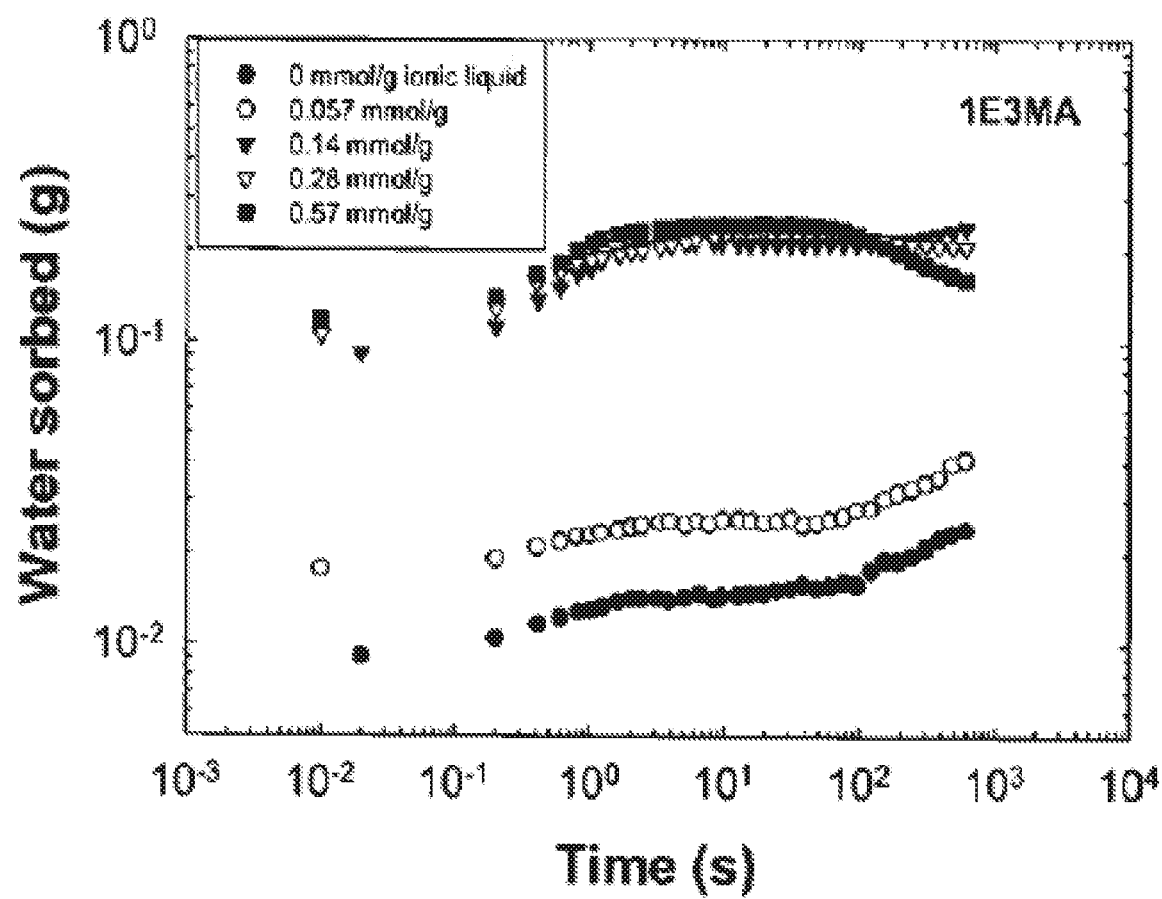
Figure 4:
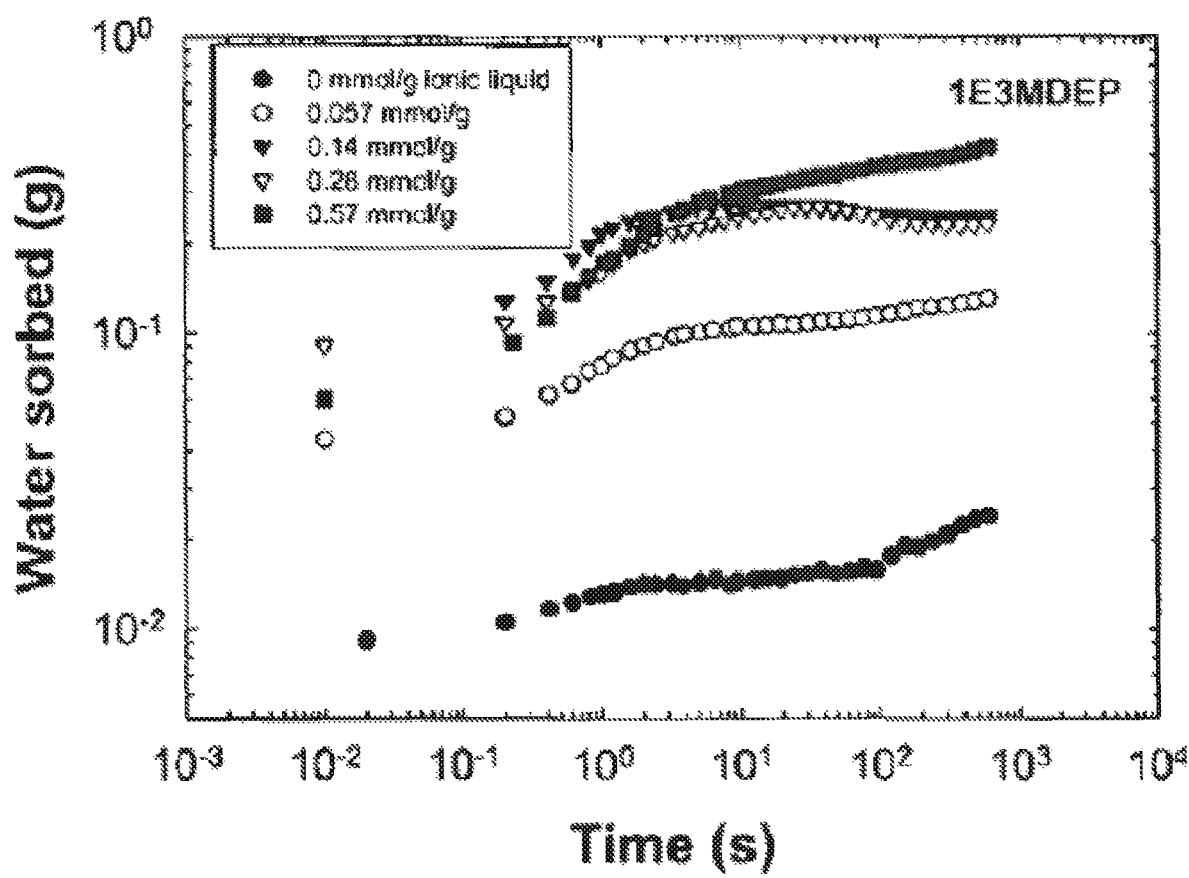
Figure 5:
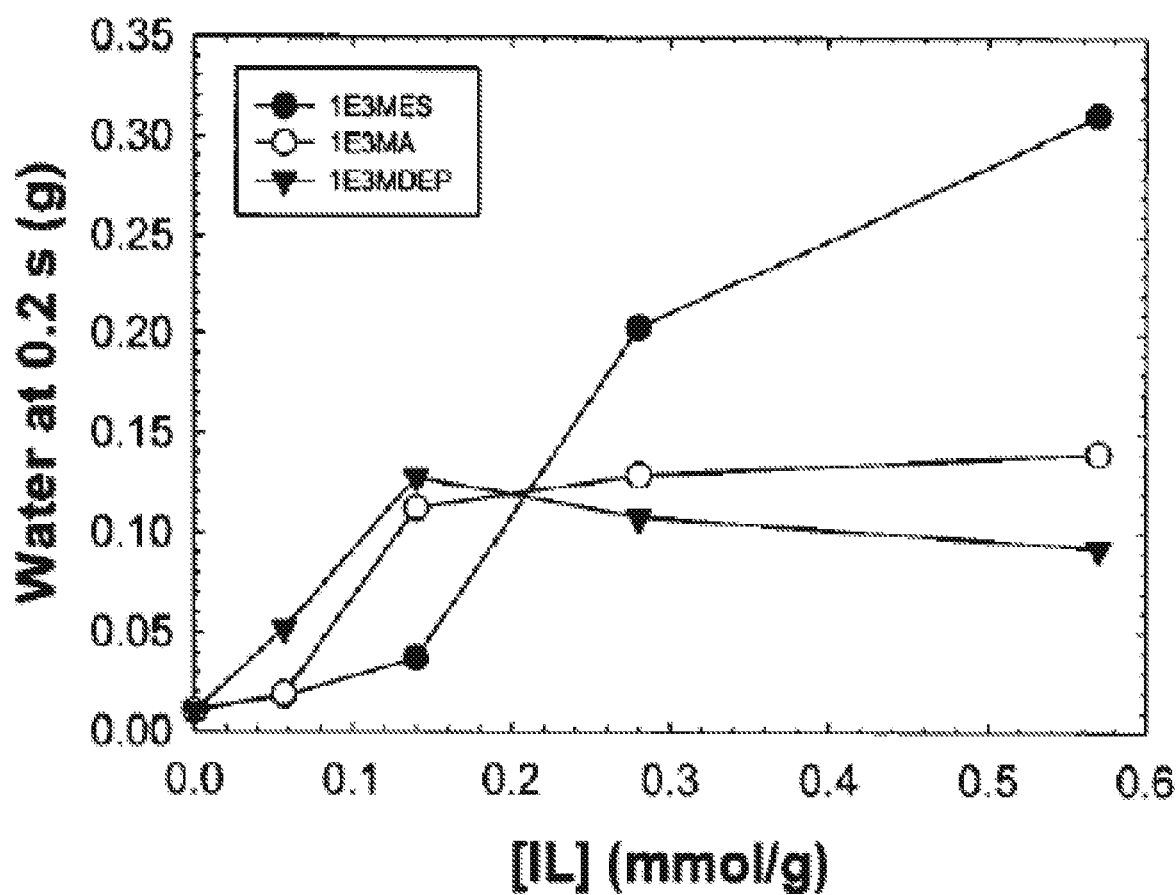
Figure 6:
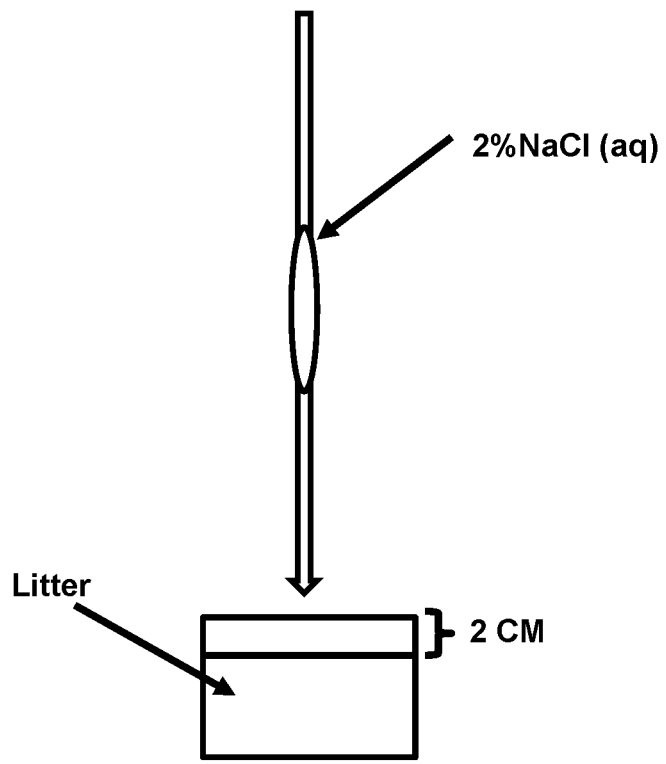
Figure 7:
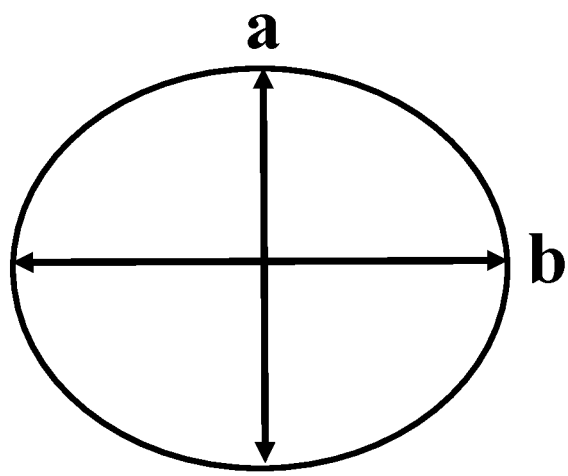
Figure 8:
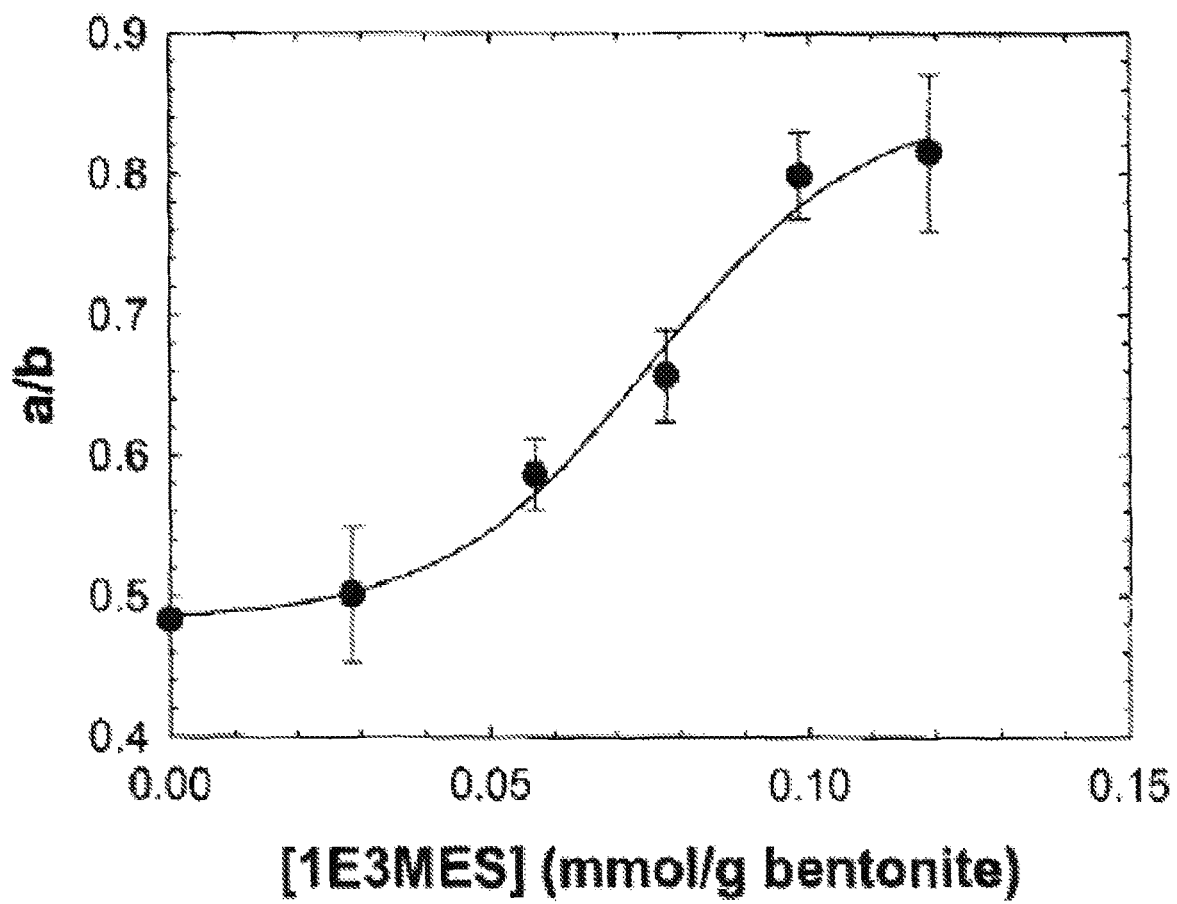

Having thus described the disclosure in general terms, reference will now be made to the accompanying drawings, which are not necessarily drawn to scale, and wherein:

FIG. 1 illustrates a schematic view of experimental setup for measuring water sorption properties of a treated clay material, according to an example embodiment of the present disclosure;

FIG. 2 illustrates a plot of the mass of water absorbed by the treated clay samples versus time, wherein the clay material is treated with 1-ethyl-3-methyl imidazolium ethylsulfate, according to an example embodiment of the present disclosure;

FIG. 3 illustrates a plot of the mass of water absorbed by the treated clay samples versus time, wherein the clay material is treated with 1-ethyl-3-methyl imidazolium acetate, according to an example embodiment of the present disclosure;

FIG. 4 illustrates a plot of the mass of water absorbed by the treated clay samples versus time, wherein the clay material is treated with 1-ethyl-3-methyl imidazolium diethylphosphate, according to an example embodiment of the present disclosure;

FIG. 5 illustrates a plot of the permeation potential of each treated clay sample as described in FIGS. 2-4, according to an example embodiment of the present disclosure;

FIG. 6 illustrates a schematic view of the experimental setup for measuring the clump shape when applying a simulated urine solution (2% sodium chloride) to the treated clay materials, according to an example embodiment of the present disclosure;

FIG. 7 illustrates a two-dimensional rendering of the axial lengths ("a" and "b") measured to calculate the clump shape ratio ("a/b"), according to an example embodiment of the present disclosure; and FIG. 8 illustrates a plot of the clump shape ratio versus the dose of 1-ethyl-3-methyl imidazolium ethylsulfate applied to a treated clay material, according to an example embodiment of the present disclosure.

DETAILED DESCRIPTION OF THE DISCLOSURE

The present disclosure now will be described more fully hereinafter with reference to specific embodiments. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a," "an," "the," include plural referents unless the context clearly dictates otherwise.

The present disclosure relates to methods and compositions for controlling flow of an aqueous liquid through a clay-based material. More particularly, one or more flow properties, such as flow rate, flow direction, flow penetration, and the like may be modified in a clay-based material through addition of an ionic liquid. The present disclosure thus relates to uses in natural settings where clay-based material may be present, such as in natural formations, as well to products of manufacture where a clay-based material may be combined with an ionic liquid to provide a product with modified flow properties. In some embodiments, ionic liquids can have applications in industries requiring flow modification, particularly with respect to clay-based materials. In particular, swelling clay formations are often found during the drilling of oil wells and related applications. When the clay formations swell upon exposure to liquids during the drilling process it can inhibit recovery processes by trapping of the drill bit and disruption of shale formations. Without intending to be bound by theory, it is expected that application of ionic liquids in such applications could benefit enhanced oil recovery processes through the inhibition of clay formation swelling and increased permeation characteristics.

The types of clay-based materials may vary and generally, the methods of controlling flow described herein are intended to be suitable for any number of clay-based materials and applications thereof. Particularly, bentonite clays (which contain the mineral montmorillonite) are commonly used due to their ability to exhibit high cation exchange capacity and a high degree of swelling upon interaction with water. Such clays may be referred to as "swelling clays" and are useful in many applications for their ability to absorb various compounds contained within an aqueous medium. For example, montmorillonite-based clays are employed in applications such as, e.g., oil exploration and extraction, foundry molding, and permeation inhibition (e.g., in holding ponds for hazardous waste). A further non-limiting example of a product including a clay-based material suitable for modification according to the present disclosure can include pet litters, and more particularly cat litters.

Clay-based litter compositions are widely used in the pet litter industry, e.g., for control of animal waste. In some embodiments, swelling clays can be useful in pet litters, in particular, based on their ability to absorb various compounds in pet urine, and form clumps which can be scooped from the litter box. While significant swelling in clays can be a benefit for some applications, such as in the case of establishing a permeation barrier, significant swelling can be disadvantageous in other applications. For example, in the area of pet litters, a rate of clay swelling that is too fast can generate a litter aggregate that is "pancake shaped" and that remains on the surface of the litter composition. Generally, this is because the significant swelling inhibits permeation of the urine far enough into the litter prior to swelling and aggregation of the litter composition. This blockage of permeation (i.e., flow of liquid within the litter) further causes pooling of urine on the surface of the litter, which can contribute undesirable wetness and put off offensive odors at the surface of the litter composition.

In some embodiments, the present disclosure relates to clay-based animal litter compositions that have been treated to control flow of liquids therethrough. The clay-based animal litter can include a variety of components found in known litter compositions, such as clay-based particles, fillers, fragrance, clump aids, and the like. The clay-based animal litters described herein may advantageously include a defined amount of at least one ionic liquid, in addition to the clay-based material, which provides for controlled flow of liquids through the litter composition and optimization of clump shape when the litter composition is wetted.

Flow behavior is often adjusted in the industry by blending a non-swelling filler, such as dolomite or limestone. However, care must be taken to avoid segregation of litter compositions when incorporating a non-swelling filler. For example, if segregation occurs, some regions of the litter may exhibit a high degree of swelling and some regions of the litter may exhibit no swelling at all, creating a highly inconsistent litter composition that is generally ineffective.

Thus, it would be beneficial to be able to treat a clay-based litter composition in a way to systematically control the flow of urine through the swelling clay. It has been surprisingly found herein, that treating a bentonite clay with one or more ionic liquids prior to use can provide a litter composition wherein liquid flow and clump shape can be easily controlled. Generally, ionic liquids are salts that remain in liquid form below about 100° C. Various types of ionic liquids may be suitable for use in flow controlled litter compositions as will be described according to embodiments of the present disclosure.

In one or more embodiments, a clay-based animal litter according to the present disclosure can comprise at least clay-based particles and a content of an ionic liquid. Optional additional ingredients may also be included as further described herein. A clay based liquid-absorbing material for use in an animal litter composition as described herein can include any such material previously recognized as useful in forming animal litters. Preferably, the clay-based liquid absorbing material is a naturally clumping clay. For example, a clay soil or comminuted rock containing at least one water swellable clay mineral (such as a montmorillonite or smectite) can be used. More particularly, a comminuted bentonite, more preferably a sodium bentonite, which contains a preponderant amount of montmorillonite clay mineral, may be used as the clay-based liquid absorbing material in the present animal litter composition. Non-limiting examples of bentonite clays that can be used include sodium bentonite, potassium bentonite, lithium bentonite, calcium bentonite and magnesium bentonite, or combinations thereof. Clay-based liquid absorbing materials useful in the present animal litter compositions are further described in U.S. Pat. No. 8,720,375 to Miller et al., the disclosure of which is incorporated herein by reference.

In one or more embodiments, the performance of the present animal litter composition can relate to one or more properties of the clay-based material apart from its ability to absorb liquid. In some embodiments, performance can be improved though use of a clay-based material exhibiting a defined particle size range. For example, suitable clay-based materials can be provided with an average particle size of about 0.2 mm to about 5 mm, about 0.3 mm to about 4 mm, or about 0.5 mm to about 3 mm. In some embodiments, the surface area of each particle of the clay-based material may comprise a defined surface area that that has been found to maximize effectiveness of the animal litter composition in exhibiting reduced adhesion to surfaces when the litter is wetted. For example, particles of the clay-based material can have an average surface area that is less than 20 m$^2$/g, less than 15 m$^2$/g, or less than 10 m$^2$/g. In each of the foregoing ranges, it is understood that the particles preferably have a minimum surface area of at least 1 m$^2$/g. In some embodiments, the particles of the clay-based material can have an average surface of about 1 m$^2$/g to about 20 m$^2$/g, about 2 m$^2$/g to about 15 m$^2$/g, or about 3 m$^2$/g to about 10 m$^2$/g. Surface area can be measured utilizing known methods, such as the Brunauer, Emmett, Teller ("BET") method wherein surface area is calculated using N$_2$ absorption. The above values, in some embodiments, thus may be referred to as the BET surface area.

The amount of the clay-based liquid absorbing material used in the present animal litter composition can vary. For example, the clay-based liquid absorbing material can form about 15% by weight to about 99.5% by weight of the composition. In further embodiments, the amount of the clay-based liquid absorbing material in the animal litter composition can be about 20% by weight to about 94% by weight, about 25% by weight to about 90% by weight, about 30% by weight to about 80% by weight, or about 35% by weight to about 55% by weight based on the total weight of the composition.

The animal litter composition also includes a content of ionic liquid that is effective to control flow through the clay and to optimize clump shape within the clay. It is understood that when an animal urinates in an animal litter, the liquid permeates the litter composition. However, the degree to which this permeation occurs can vary. As noted above, traditional clay-based animal litter compositions typically provide liquid permeation rates that are less than desirable (e.g., inhibits permeation of the liquid). This particular disadvantage can be overcome by treating the clay-based animal litter composition with at least one ionic liquid.

As used herein, an "ionic liquid" is meant to refer to a molten salt, which remains a liquid (non-volatile) at room temperature, and, in some embodiments, remains a liquid at temperatures below about 100° C. The types of ionic liquids suitable for use in the present animal litter compositions may vary. Generally, any ionic liquid may be suitable for use in the litter compositions described herein given that similar ionic functionalities (i.e., a cationic moiety and an anionic counter-ion) are common to all ionic liquids. In some embodiments, for example, suitable ionic liquids may include room-temperature variety ionic liquids such as imidazolium-based ionic liquids, pyridinium-based ionic liquids, pyrrolidinium-based ionic liquids, and the like. Particular examples of imidazolium-based ionic liquids suitable for use in animal litter compositions of the present disclosure include, but are not limited to: 1-ethyl-3-methyl imidazolium ethylsulfate (1E3MES), 1-ethyl-3methyl imidazolium acetate (1E3MA), 1-ethyl-3-methyl imidazolium diethylphosphate (1E3MDEP), 1-octyl-3-methyl imidazolium bromide (1O3MBr), 1-hexyl-3-methyl imidazolium chloride (1H3MCl), 1-butyl-3-methyl imidazolium octylsulfate (1B3MOS), 1-butyl-3-methyl imidazolium bromide (1B3MBr), and combinations thereof. Many of these ionic liquids can be found commercially, for example, 1E3MES is available commercially from BASF, Corp. under the trade name BASIONICS LQ01.

The amount of ionic liquid applied to the present animal litter composition can vary. Generally, the ionic liquid is provided in relatively law amounts, e.g., such as less than about 1 mmol/g clay-based liquid absorbing material. In some embodiments, the disclosed animal litter composition may comprise about 0.001 to about 1.0 mmol ionic liquid/g clay-based liquid absorbing material, or about 0.05 to about 0.5 mmol ionic liquid/g clay-based liquid absorbing material, or about 0.01 to about 0.2 mmol ionic liquid/g clay-based liquid absorbing material. As described herein, the amount of ionic liquid may be referred to in relation to a weight percentage of ionic liquid based on the total weight of the clay-based liquid absorbing material and the ionic liquid combined. For example, in some embodiments, the disclosed animal litter composition may comprise an ionic liquid in an amount of about 0.15% to about 5.0% by weight, about 0.5% to about 3.5% by weight, or about 1.0% to about 2.5% by weight, based on the total weight of the clay-based liquid absorbing material and the ionic liquid.

The presently disclosed methods and compositions can be particularly beneficial in that they can provide the ability to control and/or modify flow properties, specifically in clay-based materials, without raising other concerns, e.g., toxicity issues. The present disclosure thus can provide the ability to achieve desired flow control properties without the requirement of utilizing materials that may raise toxicity concerns, such as various surfactants (e.g., cationic surfactants, such as alkyl quaternium ammonium salts). In addition to the toxicity concerns, cationic surfactants such as alkyl quaternium ammonium salts, generally exist in solid form at room temperature, thus requiring further addition of a carrier solvent (e.g., water or alcohols typically) prior to addition to the swelling clay. Following addition of the solvent and the cationic surfactant to the clay-based materials, the resulting composition must be dried to remove the excess moisture introduced due to requirement of using the carrier solvent. By contrast, treatment of clay-based liquid absorbing materials with ionic liquids is particularly advantageous due to the fact that addition of these ionic liquids to the clay-based liquid absorbing materials can be performed without a carrier solvent (i.e., because the ionic liquid is a liquid at room temperature) and without the necessity of drying following addition of the ionic liquids to the clay-based litter compositions. Such advantages can increase efficiency and reduce costs in the manufacturing process while also providing the aforementioned controlled flow and clump shape characteristics.

In one or more embodiments, the animal litter composition may also include one or more clumping agents, or clump enhancing materials. Description of suitable clumping agents is provided in U.S. Pat. No. 8,720,375 to Miller et al., the disclosure of which is incorporated herein by reference. Useful clumping agents are those materials suitable to promote adhesion of the fine size particles of litter granules to each other as well as adhesion of the particles to form agglomerates when wetted. Preferably, the clumping agent allows the formation of a gelled agglomerate when exposed to a liquid, such as animal urine. A clumping agent may be provided in admixture (e.g., in particle form) with the further particles forming the animal litter. In some embodiments, the clumping agent can be provided as a coating on at least a portion of the other particles forming the animal litter (e.g., as a coating on at least a portion of the filler material). Such coatings may be provided by any known method, such as spraying.

Non-limiting examples of materials suitable for use as a clumping agent include naturally occurring polymers (e.g., naturally occurring starches, water soluble polysaccharides, and gums), semisynthetic polymers (e.g., cellulose derivatives, such as carboxymethyl cellulose), and sealants. Exemplary clumping agents include amylopectins, natural gums, and sodium carboxymethylcellulose. The amount of any clumping agent that is present in the animal litter composition can vary based upon the total composition. For example, it can be useful to include a greater amount of clumping agents when a greater amount of non-absorbent fillers is used. In some embodiments, the amount of clumping aid can be adjusted based on the amount of ionic liquid in the animal litter composition in order to further optimize the clumping behavior of the animal litter composition. In some embodiments, clumping agents can be present in a total amount of 0.1% by weight to about 6% by weight, about 0.2% by weight to about 5.5% by weight, about 0.3% by weight to about 5% by weight, or about 0.5% by weight to about 4% by weight.

In one or more embodiments, the animal litter composition may also include one or more fillers. Fillers suitable for use in the present animal litter compositions can include a variety of materials that can be a non-absorbent, non-soluble substrate, or can be an absorbent substrate. In one or more embodiments, useful fillers can include absorbent substrates, such as non-clumping clays. Non-limiting examples of useful non-clumping clays include attapulgite, Fuller's earth, calcium bentonite, palygorskite, sepiolite, kaolinite, illite, halloysite, hormite, vermiculite or mixtures thereof. Suitable fillers according to the present disclosure also can include a variety of non-absorbent, non-soluble substrates, such as non-clay substances. Non-limiting examples of non-clay materials that can be used include zeolites, crushed stone (e.g., dolomite and limestone), gypsum, sand, calcite, recycled waste materials, and silica.

In some embodiments, it can be useful to provide the filler material in a form exhibiting specific characteristics. For example, it can be useful for the filler material to exhibit an average particle size that is approximately the same as the clay-based liquid absorbing material particles. In particular, the filler material may exhibit an average particle size that is +/−20%, +/−15%, +/−10%, or +/−5% of the average particle size of the clay-based liquid absorbing material particle size. In some embodiments, it likewise can be useful for the filler material to have an average surface area that is approximately the same as the surface area of the clay-based liquid absorbing material particles. The above tolerances thus likewise can apply to surface area.

The amount of the filler used in the present animal litter composition can vary. In some embodiments, filler may be expressly excluded (i.e., forming 0% of the litter composition). Preferably, the filler provides the balance of the animal litter composition after all other materials are included. As examples, the animal litter composition can comprise about 0% by weight to about 75% by weight, about 10% by weight to about 70% by weight, about 25% by weight to about 65% by weight, or about 40% by weight to about 60% by weight of the filler based on the total weight of the animal litter composition.

In addition to the foregoing, one or more further materials may be included in the present animal litter composition. Specifically, any conventional litter additive may be included to the extent that there is no interference with the ability of the litter composition to provide the useful effect of reduced adherence to surfaces when wetted. Non-limiting examples of additional materials that may be used include binders, preservatives, such as biocides (e.g., benzisothiazolinone, methylisothiazolone), de-dusting agents, fragrance, bicarbonates, and combinations thereof. Each of the foregoing materials separately may be included in any amount up to about 5% by weight, up to about 2% by weight, up to about 1% by weight, or up to about 0.5% by weight, such as about 0.01% by weight to about 5% by weight, to about 4% by weight, to about 3% by weight, to about 2% by weight, or to about 1% by weight based on the total weight of the animal litter composition. Further, it is understood that any one or more of such materials may be expressly excluded from the present animal litter composition.

In one or more embodiments, an animal litter composition according to the present disclosure providing controlled flow and optimized clump shape can include ionic liquids in the ranges shown in Table 1 below (e.g., where the amount of ionic liquid is based on the is based on the amount of clay material).

TABLE 1

| Ionic liquid | Abbreviation | Molar mass | Concentration (mmol/g bentonite) | Wt. % range |
|---|---|---|---|---|
| 1-ethyl-3-methyl imidazolium ethylsulfate | 1E3MES | 236.29 | 0.01-0.2 | 0.24-4.5 |

TABLE 1-continued

| Ionic liquid | Abbreviation | Molar mass | Concentration (mmol/g bentonite) | Wt. % range |
|---|---|---|---|---|
| 1-ethyl-3-methyl imidazolium acetate | 1E3MA | 170.22 | 0.01-0.2 | 0.17-3.3 |
| 1-ethyl-3-methyl imidazolium diethylphosphate | 1E3MDEP | 264.26 | 0.01-0.2 | 0.26-5.0 |
| Sodium bentonite | | | | q.s. |

These particular formulations and combinations of components are not to be construed as limiting and the specific amounts of individual components may vary based on the desired flow characteristics, permeation depth, and/or other factors. The animal litter compositions described herein may be used for a wide variety of animals and birds, e.g., uncaged household pets, such as cats and dogs, particularly puppies too young to be walked; caged pets, such as hamsters, gerbils and rabbits; caged laboratory animals, such as guinea pigs, mice, rats and monkeys; animals raised for fur, such as mink; barnyard birds, such as chickens, ducks and geese; and pet birds, such as parrots, parakeets, *canaries* and pigeons. The compositions of this invention are particularly suitable for use as cat litters.

As noted above, the present disclosure also provides methods for controlling flow in clay-based materials generally. In some embodiments, for example, the present disclosure provides a method for controlling swelling of a clay when in contact with an aqueous medium, the method comprising contacting clay with a content of an ionic liquid sufficient to modify one or more transport properties of water through the clay. In some embodiments, the clay is contacted with the ionic liquid prior to contact with the aqueous medium. Alternatively, in some embodiments, the clay, the ionic liquid, and the aqueous medium may be contacted simultaneously. Particularly, the methods disclosed herein may be sufficient to modify one or more transport properties of water through the clay, e.g., permeation rate, flow rate, rate of sorption, directional flow, and combinations thereof.

Some embodiments of the present disclosure provide, in particular, methods for producing an animal litter composition with controlled flow. The method may comprise a first step of mixing a clay-based liquid absorbing material and at least one ionic liquid in an amount sufficient to control the flow of urine in the animal litter composition. Advantageously, methods according to the present disclosure provide for mixing of the ionic liquid in the express absence of a carrier solvent and further, the present methods do not necessarily require drying of the litter composition following treatment with the at least one ionic liquid.

EXPERIMENTAL

Aspects of the present invention are more fully illustrated by the following examples, which are set forth to illustrate certain aspects of the present invention and are not to be construed as limiting thereof.

Example 1

Testing was carried out to analyze the liquid sorption properties of clay-based animal litters that had been treated with three different ionic liquids. The clay-based animal litters included 100% sodium bentonite with a particle size range of 0.40 to 1.68 mm. The ionic liquids tested were: 1-ethyl-3-methyl imidazolium ethyl sulfate (1E3MES); 1-ethyl-3-methyl imidazolium acetate (1E3MA); and (1-ethyl-3-methyl imidazolium diethylphosphate (1E3MDEP). The ionic liquids and their associated properties are shown in Table 2 below.

TABLE 2

| Ionic liquid | Abbreviation | Molar mass | Melting point (° C.) |
|---|---|---|---|
| 1-ethyl-3-methyl imidazolium ethyl sulfate | 1E3MES | 236.29 | <−20 |
| 1-ethyl-3-methyl imidazolium acetate | 1E3MA | 170.22 | <−20 |
| 1-ethyl-3-methyl imidazolium diethylphosphate | 1E3MDEP | 264.26 | 10 |

The bentonite clay samples were treated with the ionic liquids from Table 2 by simple mixing. The clay samples were placed in a small dish. Then, drops of ionic liquid were slowly added to the clays and the samples were stirred by hand to provide the treated clay samples. The ionic liquids were applied to the clay samples in amounts ranging from 0 to about 0.57 mmol ionic liquid/g bentonite, including a control sample containing 0 mmol ionic liquid/g bentonite.

Data are generally presented in terms mmol of ionic liquid per g of bentonite (mmol/g) in order to provide comparison of different ionic liquids. In Table 3 below, however, corresponding compositions based on wt. % of the total composition are presented.

TABLE 3

| [ionic Liquid] mmol/g | Wt. % 1E3MES | Wt. % 1E3MA | Wt. % 1E3MDEP | Wt. % Bentonite |
|---|---|---|---|---|
| 0 | 0 | 0 | 0 | 100 |
| 0.057 | 1.33 | 0.96 | 1.48 | q.s. |
| 0.14 | 3.20 | 2.33 | 3.57 | q.s. |
| 0.28 | 6.21 | 4.55 | 6.89 | q.s. |
| 0.57 | 11.9 | 8.84 | 13.1 | q.s. |

Next, the permeation potential in the treated clay samples was assessed by monitoring the mass of liquid that could be absorbed by each individual sample of treated clay when placed in contact with the liquid. Three grams of the treated clay samples were individually placed in a small cylinder (4.5 cm long×1.2 cm diameter) having a porous bottom. The cylinder was lowered into a water bath at an immersion depth of 1.0 mm and the mass of water absorbed by the treated clay sample was recorded as a function of time. The measurement was performed with a Kruss K-100 tensiometer with an FL-12 accessory (commercially available). A schematic of the experimental set-up is depicted in FIG. 1.

It should be noted that in cases where significant swelling occurs in the clay, it would be expected that the amount of water absorbed by the clay samples would be minimized, for example, due to the initial swelling of clay upon contact with water and subsequent blockage of further liquid flow. By contrast, as the swelling of the clay becomes more inhibited, more liquid is able to permeate through the clay, driven by capillary action. Shown in FIGS. 2-4 are plots of the mass of water absorbed versus time for clay samples treated with 1E3MES (FIG. 2), clay samples treated with 1E3MA (FIG. 3), and clay samples treated with 1E3MDEP (FIG. 4). The control sample containing zero mmol of ionic liquid is also shown in each plot as a basis for comparison.

It can be seen in the water sorption plots that the amount of ionic liquid added to the clay samples had a positive correlation with the amount of water sorbed. For example, each of the clay samples tested (e.g., having been treated with one of the three ionic liquids) demonstrated and increase in water sorbed as the amount of ionic liquid increased, thus exhibiting increased water permeation in the clay samples themselves. The change in amount of water sorption relative to the concentration of the ionic liquid added varied between the three different types of ionic liquids used, e.g., the water sorption values of 1E3MES increased gradually relative to the concentration added, whereas the water sorption values increased to a relative peak quickly for 1E3MA and 1E3MDEP before levelling off at higher concentrations.

In order to compare permeation potentials in the three systems, water mass values at t=0.2 seconds were plotted versus ionic liquid dose ([IL]) as depicted in FIG. 5. Slightly different behaviors were observed with respect to each of the different ionic liquids. For example, at low concentrations of ionic liquid (e.g., <0.2 mmol/g bentonite), 1E3MA and 1E3MDEP were more effective at enhancing permeation. Particularly, 1E3MDEP reached a maximum permeation potential at 0.14 mmol/g bentonite and permeation potential reduced thereafter. Meanwhile, the permeation potential of 1E3MA tended to essentially level-off past a concentration of 0.14 mmol/g bentonite. However, the 1E3MES clay samples actually demonstrated the highest permeation potential when added in higher concentrations, despite showing relatively low permeation potential at low concentrations.

Example 2

Further testing was carried out to optimize the clump shape that could be attained with clay-based animal litters treated with ionic liquids. In order to demonstrate the systematic change in clump shape that could be attained with the addition of ionic liquids, additional samples were prepared with 1E3MES at concentrations ranging from 0 to 0.57 mm/g bentonite. As above, Table 4 below presents corresponding levels of 1E3MES in wt. %, based on the total weight of the composition of bentonite and ionic liquid, for each of the compositions tested.

TABLE 4

| [1E3MES] mmol/g | Wt. % 1E3MES | Wt. % Bentonite |
|---|---|---|
| 0 | 0 | 100 |
| 0.0285 | 0.67 | q.s. |
| 0.057 | 1.33 | q.s. |
| 0.078 | 1.81 | q.s. |
| 0.099 | 2.29 | q.s. |
| 0.12 | 2.76 | q.s. |
| 0.14 | 3.20 | q.s. |

To simulate the flow action associated with traditional litter box use, urine flow was simulated using flow from a volumetric pipette. For example, 250 g of treated bentonite clay was placed in a circular glass dish (9.5 cm diameter×5.5 cm tall). Then, a 5 mL volumetric pipette (loaded with 2% w/w NaCl(aq.) to simulate urine) was mounted so that the tip of the pipette was 2 cm above the surface of the litter. A schematic of the experimental setup is shown in FIG. 6.

The 2% sodium chloride solution was allowed to drop into the litter for a time sufficient to form a clump of used litter, which acted to represent a wetting action of cat urine. Following dispensing of the NaCl solution and formation of this clump, the clump was scooped from the litter composition. Two measurements were recorded for each clump, e.g., a length defined along "a" (the axis of liquid flow from the pipette), and a length defined along "b" (the axis perpendicular to the axis of liquid flow), as depicted in FIG. 7.

Generally, the value of length "a" divided by the value of length "b" is referred to herein as the clump shape ratio (i.e., "a/b") For clump shape ratios less than 1, the shape of clump may be referred to herein as being "pancake shaped," or in the shape of an oblate spheroid. For clump shape ratios that are greater than 1, the shape of the clump may be referred to herein as being in the shape of a prolate spheroid. When the clump shape ratio is substantially equal to 1, the shape of the clump may be referred to herein as being spherical. Without intending to be bound by theory, it should be noted that it is desirable to provide a clump shape that is substantially spherical and thus, samples exhibiting a/b values closer to 1 are generally preferred in comparison to samples exhibiting clump shapes that are pancake shaped or prolate spheroid shaped. Generally, clay samples exhibiting the spherical clump shape demonstrate the ideal permeation characteristics such that pooling on the surface of the litter is prevented while also maintaining the integrity of the clump (i.e., such that it does not fall apart when scooped out of the litter box).

As depicted in FIG. 8, as the concentration of 1E3MES was increased, the values of a/b increased from about 0.5 to up to about 0.8, indicating a clump shape that is substantially more spherical with the addition of the ionic liquid, particularly at concentrations between about 0.8 and 0.13 mm/g bentonite. In addition, it was observed that treated bentonite samples exhibited no pooling of urine and smaller wetted regions at the surface of the litter when compared to non-treated bentonite samples, which particularly exhibited a high degree of pooling and large wetted regions on the surface. Advantageously, the more spherical shaped clumps in the treated bentonite samples tend to lie further below the surface of the litter composition when compared to the non-treated samples, thus minimizing exposure of the clump to air and subsequently offensive odor production. Further, the spherical shaped clumps are much less likely to fall apart during removal from the litter box.

It should be noted that upon application of 0.14 mmol 1E3MES/g bentonite, the clumps formed tended to break apart upon removal. Thus, the inventors have acknowledged that there is an upper limit to the amount of ionic liquid that can be added without experiencing negative effects, e.g., such as loss of spherical shape and/or breaking apart of the clumps upon removal. This upper limit may vary based on the type of ionic liquid used and the characteristics thereof, for example, ionic liquids with different permeation characteristics may work effectively in higher or lower amounts than 1E3MES.

Use of the words "about" and "substantially" herein are understood to mean that values that are listed as "about" a certain value or "substantially" a certain value may vary by an industry recognized tolerance level for the specified value. When an industry recognized tolerance is unavailable, it is understood that such terminology may indicate that an acceptable value may be vary ±3%, ±2%, or ±1% from the specifically listed value.

Many modifications and other embodiments of the disclosure set forth herein will come to mind to one skilled in the art to which these disclosures pertain having the benefit of the teachings presented in the foregoing descriptions. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for controlling swelling of a clay when in contact with an aqueous medium, the method comprising contacting clay with a content of an ionic liquid sufficient to modify one or more transport properties of water through the clay,
wherein the ionic liquid is selected from the group consisting of 1-ethyl-3-methyl imidazolium ethylsulfate, 1-ethyl-3-methyl imidazolium acetate, 1-ethyl-3-methyl imidazolium diethylphosphate, and combinations thereof.

2. The method of claim 1, wherein the clay is contacted with the ionic liquid prior to contact with the aqueous medium, or wherein the clay, the ionic liquid, and the aqueous medium are contacted simultaneously.

3. The method of claim 1, wherein one or both of the following conditions is met:
the clay is a bentonite clay;
the one or more transport properties are selected from the group consisting of permeation rate, flow rate, rate of sorption, directional flow, and combinations thereof.

4. An animal litter composition comprising:
a clay-based liquid absorbing material; and
at least one ionic liquid,
wherein the animal litter further comprises a filler comprising one or both of a non-absorbent, non-soluble substrate and an absorbent substrate, or wherein the animal litter further comprises one or more materials selected from the group consisting of clumping agents, de-dusting agents, fragrances, bicarbonates, binders, and preservatives.

5. The animal litter composition of claim 4, wherein the ionic liquid is present in an amount of about 0.01 mmol/g clay-based liquid absorbing material to about 0.2 mmol/g clay-based liquid absorbing material.

6. The animal litter composition of claim 4, wherein the ionic liquid is an imidazolium salt.

7. The animal litter composition of claim 4, wherein the at least one ionic liquid is selected from the group consisting of 1-ethyl-3-methyl imidazolium ethylsulfate, 1-ethyl-3-methyl imidazolium acetate, 1-ethyl-3-methyl imidazolium diethylphosphate, and combinations thereof.

8. The animal litter composition of claim 4, wherein the clay-based liquid absorbing material has a surface area of about 15 $m^2$/g or less.

9. The animal litter composition of claim 4, wherein the clay-based liquid absorbing material has a surface area of about 10 $m^2$/g or less.

10. The animal litter composition of claim 4, wherein the clay-based liquid absorbing material has an average particle size of about 0.1 mm to about 5 mm.

11. The animal litter composition of claim 4, wherein the clay-based liquid absorbing material comprises bentonite clay.

12. The animal litter composition of claim 4, comprising:
the clay-based liquid absorbing material in an amount of about 35% to about 55% by weight, based on the total weight of the animal litter composition;

a filler in an amount of about 40% to about 60% by weight, based on the total weight of the animal litter composition, the filler being a non-absorbent, non-soluble substrate; and the ionic liquid present in an amount of about 0.15% to about 5.0% by weight, based on the total weight of the clay-based liquid absorbing material and the ionic liquid.

13. A method of preparing an animal litter composition having modified flow properties, the method comprising forming an animal litter composition as a mixture of at least a clay-based liquid absorbing material and at least one ionic liquid, wherein the mixture further comprises a filler comprising one or both of a non-absorbent, non-soluble substrate and an absorbent substrate, or wherein the mixture further comprises one or more materials selected from the group consisting of clumping agents, de-dusting agents, fragrances, bicarbonates, binders, and preservatives.

14. The method of claim 13, wherein the ionic liquid is combined with the clay-based liquid absorbing material prior to adding the one or more additives, or wherein the one or more additives are added to the clay-based liquid absorbing materials prior to mixing with the at least one ionic liquid.

15. The method of claim 13, wherein one or more of the following conditions is met:

the ionic liquid is added in the express absence of a carrier solvent;

the method excludes drying the animal litter composition;

the ionic liquid is an imidazolium salt;

the ionic liquid is selected from the group consisting of 1-ethyl-3-methyl imidazolium ethylsulfate, 1-ethyl-3-methyl imidazolium acetate, 1-ethyl-3-methyl imidazolium diethylphosphate, and combinations thereof;

the ionic liquid is applied in an amount of about 0.01 mmol/g clay-based liquid absorbing material to about 0.2 mmol/g clay-based liquid absorbing material.

* * * * *